(12) United States Patent
Dilorio et al.

(10) Patent No.: US 6,533,938 B1
(45) Date of Patent: Mar. 18, 2003

(54) POLYMER ENHANCED DIAFILTRATION: FILTRATION USING PGA

(75) Inventors: Alexander Dilorio, Sutton, MA (US); Sonny Mark, Ithaca, NY (US); Philip A. Tongue, Worcester, MA (US)

(73) Assignee: Worcester Polytechnic Institue, Worcester, MA (US)

( * ) Notice: Subject to any disclaimer, the term of this patent is extended or adjusted under 35 U.S.C. 154(b) by 0 days.

(21) Appl. No.: 09/579,794

(22) Filed: May 26, 2000

Related U.S. Application Data

(60) Provisional application No. 60/136,562, filed on May 27, 1999.

(51) Int. Cl.[7] .............................................. B01D 61/00
(52) U.S. Cl. ....................... 210/651; 210/650; 210/652; 210/639; 210/912; 210/684; 210/688; 210/729; 210/730; 423/8; 423/9
(58) Field of Search ................................ 210/650, 651, 210/652, 638, 639, 912, 684, 688, 729, 730; 423/8, 9

(56) References Cited

U.S. PATENT DOCUMENTS

| | | | |
|---|---|---|---|
| 5,378,807 A | 1/1995 | Gross et al. | 530/350 |
| 5,766,478 A | 6/1998 | Smith et al. | 210/638 |
| 5,891,956 A | 4/1999 | Smith et al. | 525/56 |
| 6,103,121 A | * 8/2000 | Bhattacharyya et al. | |
| 6,184,336 B1 | * 2/2001 | Tang | |
| 6,242,009 B1 | * 6/2001 | Batarseh et al. | |

FOREIGN PATENT DOCUMENTS

| | | |
|---|---|---|
| EP | 0 337 707 A2 | 4/1989 |

OTHER PUBLICATIONS

Birrer, Gregory A. et al., "γ–Poly(Glutamic Acid) Biosynthesis By *Bacillus licheniformis* ATCC 9945a: Physiological Studies," *Polym. Mater. Sci. Eng.*, 67:134–136 (1992).

Birrer, Gregory A. et al., "γ–Poly(glutamic acid) formation by *Bacillus licheniformis* 9945a: physiological and biochemical studies," *Int. J. Biol. Macromol.*, 16(5):265–275 (1994).

Cheng, Cheng et al., "Production of γ–Polyglutamic Acid by *Bacillus licheniformis* A35 under Denitrifying Conditions," *Agric. Biol. Chem.*, 53 (9):2369–2375 (1989).

Cromwick, Anne–Marie et al., "Effects of manganese (II) on *Bacillus licheniformis* ATCC 9945A physiology and γ–poly(glutamic acid) formation", *Int. J. Biol. Macromol.*, 17(5):259–267 (1995).

Cromwick, Anne–Marie et al., "Effects of pH and Aeration on γ–Poly(glutamic acid) Formation by *Bacillus licheniformis* in Controlled Batch Fermentor Cultures," *Biotechnology and Bioengineering*, 50:222–227 (1996).

Cromwick, Anne–Marie et al., "Investigation by NMR of metabolic routes to bacterial γ–poly(glutamic acid) using [13]C–labeled citrate and glutamate as media carbon sources," *Can. J. Microbiol.* 41:902–909 (1995).

(List continued on next page.)

*Primary Examiner*—Ana Fortuna
(74) *Attorney, Agent, or Firm*—Hamilton, Brook, Smith & Reynolds, P.C.

(57) ABSTRACT

A method is describe for removing metal ions of interest from aqueous solutions containing low concentrations of the metal ions of interest. The method involves the use of a microbially produced polymer, γ-glutamic acid. The polymer is used in conjunction with tangential flow filtration and results in substantial removal of metal ions.

50 Claims, 10 Drawing Sheets

OTHER PUBLICATIONS

Fowler, Adam J., "Polymer–Enhanced Diafiltration (PEDF) Using Bacterial Poly–γ–Glutamic Acid For The Removal of Heavy Metals From Aqueous Streams," Unpublished Masters Thesis, Worcester Polytechnic Institute, Worcester, MA pp. 1–131 (May 1999).

Giannos, Steven A. et al., "The Biosynthesis of Unusual Polyamides Containing Glutamic Acid," *Proceedings of the ACS Division of Polymeric–Materials Science and Engineering*, 62:236–240 (1990).

Goto, Atsuo et al., "Biosynthesis and Hydrolysis of Poly(γ–glutamic acid) from *Bacillus subtilis* IFO3335," *Biosci. Biotech. Biochem.*, 56(7):1031–1035 (1992).

Kubota, Hidetoshi et al., "Production of Poly (γ–glutamic acid) by *Bacillus subtilis* F–2–01," *Biosci. Biotech. Biochem.*, 57(7):1212–1213 (1993).

Kunioka, Masao et al., "Biosynthesis of poly(γ–glutamic acid) from L–glutamic acid, citric acid, and ammonium sulfate in *Bacillus subtilis* IFO3335," *Appl. Microbiol. Biotechnol.* 40:867–872 (1994).

Mark, Sonny S. et al., "Heavy Metal Removal from Aqueous Solution Using a Bacterial Poly–Gamma–Glutamic Acid," Abstract of Oral Presentation at the 1997 Annual AIChE Meeting, (Nov. 19, 1997).

Smith, Barbara F. et al., "Water–Soluble Metal–Binding Polymers with Ultrafiltration/A Technology for the Removal, Concentration, and Recovery of Metal Ions from Aqueous Streams," R. Rogers, A. Bond and Dietz, eds., *Advances in Metal Ion Separation and Preconcentration*, Chapter 20 (1998).

Smith, Barbara F. et al., "Polymer Filtration: A New Technology for Selective Metals Recovery," *Los Alamos National Laboratory*, Downloaded Mar. 22, 2000 from http://www.polyfiler.lanl.gov/Pubs/pub01.htm (1999).

Smith, B.F. et al., "Preconcentration of low levels of americium and plutonium from waste waters by synthetic water–soluble metal–binding polymers with ultrafiltration," *J. of Radioanalytical and Nuclear Chemistry*, 234 (1–2):225–229 (1998).

Smith, Barbara F., "Polymer Filtration (PF) System," *Los Alamos National Laboratory and Boeing Defense and Space Groups*, Downloaded from http://www.polyfilter.lanl.gov/html/output–publis.htm pp. 1–15 (1995).

Stock, Richard, Louis II, "Rheological Characterization of (Poly–γ) Glutamic Acid Fermentations," Unpublished Masters Thesis, Worcester Polytechnic Institute, Worcester, MA (Aug. 1996).

Stock, R., "Rheological Characterization of (poly)–γ Glutamic Acid Fermentations," *Abstracts of Papers American Chemical Society*, 211(1–2):biot28 (1996).

Tabatabai, Ahmadali et al., "Water Softening Using Poly-electrolyte–Enhanced Ultrafiltration," *Separation Science and Technology*, 30(2):211–224 (1995).

* cited by examiner

| Permeate Passed (mL) | Not Prediafiltered ||| Prediafiltered |||
|---|---|---|---|---|---|---|
| | TMP (PSI) | Flux (cm/s) | Permeate [Cu] (mg/L) | TMP (PSI) | Flux (cm/s) | Permeate [Cu] (mg/L) |
| 100 | 12.6 | 0.00185 | 1.278 | 15.1 | 0.00227 | 0.282 |
| 200 | 13.1 | 0.00203 | 1.731 | 14.9 | 0.00240 | 0.216 |
| 300 | 14.8 | 0.00215 | 1.715 | 15.0 | 0.00237 | 0.199 |
| 400 | 15.0 | 0.00228 | 1.553 | 15.0 | 0.00240 | 0.183 |
| 500 | 14.8 | 0.00238 | 1.392 | 15.0 | 0.00240 | 0.133 |
| 600 | 14.8 | 0.00245 | 1.327 | 14.8 | 0.00240 | 0.199 |
| 700 | 14.5 | 0.00249 | 1.165 | 14.6 | 0.00244 | 0.183 |
| 800 | 14.6 | 0.00243 | 1.068 | 14.6 | 0.00248 | 0.183 |
| 900 | 15.0 | 0.00261 | 0.890 | 14.7 | 0.00243 | 0.150 |
| 1000 | 14.2 | 0.00269 | 0.793 | 14.6 | 0.00247 | 0.150 |
| 1100 | 13.4 | 0.00253 | 0.647 | 14.4 | 0.00247 | 0.133 |
| 1200 | 16.8 | 0.00273 | 0.599 | 14.2 | 0.00245 | 0.083 |
| 1300 | 13.2 | 0.00278 | 0.534 | 14.1 | 0.00248 | 0.100 |
| 1400 | 13.8 | 0.00248 | 0.437 | 14.0 | 0.00245 | 0.133 |
| 1500 | 14.2 | 0.00272 | 0.405 | 14.0 | 0.00246 | 0.116 |
| 1600 | 15.6 | 0.00278 | 0.356 | 14.0 | 0.00246 | 0.166 |
| 1700 | 16.1 | 0.00283 | 0.356 | 15.5 | 0.00251 | 0.166 |
| 1800 | 16.0 | 0.00289 | 0.324 | 15.4 | 0.00250 | 0.150 |
| 1900 | 16.5 | 0.00289 | 0.275 | 15.3 | 0.00249 | 0.150 |
| 2000 | 16.6 | 0.00292 | 0.259 | 15.2 | 0.00252 | 0.150 |
| 2100 | 16.6 | 0.00300 | 0.259 | 15.2 | 0.00249 | 0.166 |
| 2200 | 16.6 | 0.00288 | 0.227 | 15.1 | 0.00250 | 0.166 |
| 2300 | 16.4 | 0.00292 | 0.227 | 15.0 | 0.00247 | 0.183 |
| 2400 | N/A | 0.00288 | 0.227 | 15.0 | 0.00250 | 0.183 |

FIG. 2

| Permeate Passed (mL) | 2 g/L γ-PGA AJF01 Control #1 | | | 2 g/L γ-PGA AJF01 Control #2 | | |
|---|---|---|---|---|---|---|
| | TMP (PSI) | Flux (cm/s) | Permeate [Cu] (mg/L) | TMP (PSI) | Flux (cm/s) | Permeate [Cu] (mg/L) |
| 100 | 12.6 | 0.00185 | 1.278 | 16.3 | 0.00192 | 0.988 |
| 200 | 13.1 | 0.00203 | 1.731 | 12.5 | 0.00203 | 1.416 |
| 300 | 14.8 | 0.00215 | 1.715 | 15.3 | 0.00223 | 1.416 |
| 400 | 15.0 | 0.00228 | 1.553 | 16.2 | 0.00225 | 1.328 |
| 500 | 14.8 | 0.00238 | 1.392 | 17.2 | 0.00235 | 1.254 |
| 600 | 14.8 | 0.00245 | 1.327 | 15.0 | 0.00229 | 1.239 |
| 700 | 14.5 | 0.00249 | 1.165 | 15.8 | 0.00246 | 1.047 |
| 800 | 14.6 | 0.00243 | 1.068 | 15.8 | 0.00249 | 0.929 |
| 900 | 15.0 | 0.00261 | 0.890 | 15.8 | 0.00251 | 0.826 |
| 1000 | 14.2 | 0.00269 | 0.793 | 15.8 | 0.00261 | 0.679 |
| 1100 | 13.4 | 0.00253 | 0.647 | 16.3 | 0.00259 | 0.590 |
| 1200 | 16.8 | 0.00273 | 0.599 | 16.4 | 0.00262 | 0.428 |
| 1300 | 13.2 | 0.00278 | 0.534 | 16.4 | 0.00263 | 0.413 |
| 1400 | 13.8 | 0.00248 | 0.437 | 16.3 | 0.00266 | 0.310 |
| 1500 | 14.2 | 0.00272 | 0.405 | 16.3 | 0.00265 | 0.325 |
| 1600 | 15.6 | 0.00278 | 0.356 | 16.3 | 0.00268 | 0.295 |
| 1700 | 16.1 | 0.00283 | 0.356 | 16.3 | 0.00265 | 0.251 |
| 1800 | 16.0 | 0.00289 | 0.324 | 16.2 | 0.00265 | 0.221 |
| 1900 | 16.5 | 0.00289 | 0.275 | 16.0 | 0.00263 | 0.148 |
| 2000 | 16.6 | 0.00292 | 0.259 | 15.8 | 0.00253 | 0.133 |
| 2100 | 16.6 | 0.00300 | 0.259 | 15.9 | 0.00263 | 0.118 |
| 2200 | 16.6 | 0.00288 | 0.227 | 15.9 | 0.00263 | 0.118 |
| 2300 | 16.4 | 0.00292 | 0.227 | 15.8 | 0.00264 | 0.133 |
| 2400 | N/A | 0.00288 | 0.227 | 16.0 | 0.00262 | 0.118 |

FIG. 5

| Permeate Passed (mL) | Low CFR 160 mL/min | | | Mid CFR 230 mL/min | | | High CFR 300 mL/min | | |
|---|---|---|---|---|---|---|---|---|---|
| | TMP (PSI) | Flux (cm/s) | Perm [Cu] | TMP (PSI) | Flux (cm/s) | Perm [Cu] | TMP (PSI) | Flux (cm/s) | Perm [Cu] |
| 100 | 12.4 | 0.00149 | 1.098 | 15.1 | 0.00227 | 0.282 | 15.3 | 0.00207 | 0.890 |
| 200 | 12.5 | 0.00158 | 1.951 | 14.9 | 0.00240 | 0.216 | 14.9 | 0.00218 | 1.718 |
| 300 | 12.7 | 0.00163 | 1.967 | 15.0 | 0.00237 | 0.199 | 15.1 | 0.00227 | 1.779 |
| 400 | 14.0 | 0.00166 | 1.820 | 15.0 | 0.00240 | 0.183 | 15.2 | 0.00239 | 1.702 |
| 500 | 14.0 | 0.00179 | 1.672 | 15.0 | 0.00240 | 0.133 | 15.3 | 0.00252 | 1.595 |
| 600 | 15.5 | 0.00188 | 1.393 | 14.8 | 0.00240 | 0.199 | 15.3 | 0.00258 | 1.534 |
| 700 | 15.9 | 0.00199 | 1.377 | 14.6 | 0.00244 | 0.183 | 15.5 | 0.00265 | 1.319 |
| 800 | 15.3 | 0.00198 | 1.197 | 14.6 | 0.00248 | 0.183 | 15.7 | 0.00269 | 1.212 |
| 900 | 14.9 | 0.00201 | 1.066 | 14.7 | 0.00243 | 0.150 | 13.8 | 0.00274 | 1.074 |
| 1000 | 15.3 | 0.00206 | 0.951 | 14.6 | 0.00247 | 0.150 | 13.9 | 0.00278 | 0.920 |
| 1100 | 15.0 | 0.00212 | 0.803 | 14.4 | 0.00247 | 0.133 | 14.0 | 0.00283 | 0.798 |
| 1200 | 15.1 | 0.00212 | 0.721 | 14.2 | 0.00245 | 0.083 | 14.3 | 0.00292 | 0.736 |
| 1300 | 15.1 | 0.00212 | 0.656 | 14.1 | 0.00248 | 0.100 | 14.2 | 0.00293 | 0.613 |
| 1400 | 15.0 | 0.00211 | 0.541 | 14.0 | 0.00245 | 0.133 | 14.3 | 0.00296 | 0.537 |
| 1500 | 14.8 | 0.00216 | 0.443 | 14.0 | 0.00246 | 0.116 | 14.3 | 0.00301 | 0.506 |
| 1600 | 15.2 | 0.00218 | 0.426 | 14.0 | 0.00246 | 0.166 | 14.2 | 0.00298 | 0.460 |
| 1700 | 15.4 | 0.00218 | 0.377 | 15.5 | 0.00251 | 0.166 | 14.2 | 0.00280 | 0.399 |
| 1800 | 15.2 | 0.00219 | 0.344 | 15.4 | 0.00250 | 0.150 | 14.2 | 0.00308 | 0.368 |
| 1900 | 15.1 | 0.00217 | 0.328 | 15.3 | 0.00249 | 0.150 | 13.9 | 0.00300 | 0.291 |
| 2000 | 15.1 | 0.00215 | 0.295 | 15.2 | 0.00252 | 0.150 | 14.1 | 0.00300 | 0.276 |
| 2100 | 15.1 | 0.00217 | 0.262 | 15.2 | 0.00249 | 0.166 | 13.8 | 0.00302 | 0.276 |
| 2200 | 14.5 | 0.00219 | 0.230 | 15.1 | 0.00250 | 0.166 | 13.8 | 0.00308 | 0.261 |
| 2300 | 14.5 | 0.00219 | 0.213 | 15.0 | 0.00247 | 0.183 | 13.8 | 0.00308 | 0.245 |
| 2400 | 14.7 | 0.00219 | 0.197 | 15.0 | 0.00250 | 0.183 | 13.7 | 0.00298 | 0.245 |

FIG. 6

| Permeate Passed (mL) | 0.1 M NaCl | | | 0.2 M NaCl | | | 0.4 M NaCl | | |
|---|---|---|---|---|---|---|---|---|---|
| | TMP (PSI) | Flux (cm/s) | Perm [Cu] | TMP (PSI) | Flux (cm/s) | Perm [Cu] | TMP (PSI) | Flux (cm/s) | Perm [Cu] |
| 100 | 9.9 | 0.00093 | 1.330 | 10.1 | 0.00067 | 1.409 | 10.3 | 0.00068 | 1.581 |
| 200 | 9.8 | 0.00100 | 1.380 | 9.8 | 0.00070 | 2.260 | 8.9 | 0.00068 | 2.796 |
| 300 | 9.9 | 0.00105 | 2.239 | 9.8 | 0.00073 | 2.786 | 12.7 | 0.00072 | 3.482 |
| 400 | 9.9 | 0.00112 | 2.323 | 9.4 | 0.00077 | 3.034 | 10.0 | 0.00073 | 3.802 |
| 500 | 9.9 | 0.00118 | 2.306 | 10.1 | 0.00081 | 3.034 | 10.4 | 0.00078 | 3.866 |
| 600 | 9.9 | 0.00123 | 2.155 | 10.5 | 0.00085 | 2.957 | 9.8 | 0.00078 | 3.882 |
| 700 | 10.0 | 0.00133 | 1.987 | 11.7 | 0.00091 | 2.678 | 10.6 | 0.00083 | 3.594 |
| 800 | 10.0 | 0.00143 | 1.886 | 10.8 | 0.00093 | 2.477 | 11.0 | 0.00088 | 3.259 |
| 900 | 10.1 | 0.00148 | 1.566 | 9.6 | 0.00101 | 2.167 | 9.0 | 0.00088 | 2.907 |
| 1000 | 10.1 | 0.00162 | 1.296 | 9.8 | 0.00107 | 1.842 | 9.5 | 0.00096 | 2.540 |
| 1100 | 10.3 | 0.00166 | 1.128 | 11.5 | 0.00113 | 1.502 | 9.9 | 0.00103 | 2.141 |
| 1200 | 10.3 | 0.00181 | 0.960 | 10.7 | 0.00118 | 1.161 | 10.0 | 0.00110 | 1.757 |
| 1300 | 11.3 | 0.00188 | 0.808 | 10.0 | 0.00133 | 1.006 | 10.1 | 0.00117 | 1.470 |
| 1400 | 10.3 | 0.00195 | 0.606 | 10.1 | 0.00137 | 0.898 | 10.4 | 0.00125 | 1.182 |
| 1500 | 11.0 | 0.00213 | 0.455 | 10.3 | 0.00146 | 0.759 | 10.5 | 0.00138 | 0.895 |
| 1600 | 9.8 | 0.00211 | 0.337 | 10.6 | 0.00158 | 0.464 | 9.6 | 0.00143 | 0.751 |
| 1700 | 9.9 | 0.00221 | 0.219 | 10.6 | 0.00161 | 0.294 | 9.8 | 0.00149 | 0.623 |
| 1800 | 10.0 | 0.00224 | 0.135 | 10.7 | 0.00168 | 0.232 | 9.8 | 0.00158 | 0.479 |
| 1900 | 10.1 | 0.00230 | 0.051 | 10.7 | 0.00171 | 0.139 | 10.0 | 0.00166 | 0.335 |
| 2000 | 10.1 | 0.00232 | 0.000 | 10.9 | 0.00175 | 0.093 | 10.2 | 0.00171 | 0.240 |
| 2100 | 10.1 | 0.00233 | 0.000 | 10.9 | 0.00176 | 0.015 | 10.4 | 0.00178 | 0.192 |
| 2200 | 10.1 | 0.00236 | 0.000 | 11.0 | 0.00180 | 0.015 | 10.5 | 0.00180 | 0.160 |
| 2300 | 10.1 | 0.00236 | 0.000 | 12.2 | 0.00182 | 0.000 | 10.6 | 0.00182 | 0.128 |
| 2400 | 10.1 | 0.00238 | 0.000 | 12.3 | 0.00195 | 0.000 | 10.6 | 0.00185 | 0.112 |

FIG. 7

- [Pb] ppm PEDF: 4 g/L PGA, 10 ppm Pb, 30K membrane, 800K MW PGA
- - EPA max. [Pb] 0.015 ppm ▲ [Cd] ppm PEDF: 4 g/L PGA, 10 ppm Cd, 30K membrane, 800K MW PGA
- - EPA max. [Cd] 0.005 ppm

POLYMER ENHANCED DIAFILTRATION: FILTRATION USING PGA

RELATED APPLICATION(S)

This application claims priority to U.S. Provisional Application No. 60/136,562, filed May 27, 1999 the entire teachings of which are incorporated herein by reference.

BACKGROUND OF THE INVENTION

Heavy metal bearing wastewaters pose serious economic challenges to many large and small businesses in the developed world and especially in the third world, where they threaten the contamination of streams and soil. Heavy metals are highly toxic and tend to persist and concentrate when released into the environment. For this reason, even dilute streams of waste can pose a serious threat to life. The United States Environmental Protection Agency (EPA) has set discharge limits on heavy metal-bearing effluence. However, in some cases, the desired discharge limit is in conflict with the economic expense of metal ion removal and the level of current technology.

Current methods to remove metal from metal-bearing wastewater include processes such as reverse osmosis, chemical precipitation, carbon absorption, and ion exchange. These methods are effective in reducing the concentration of metal ions when present at high concentrations, but typically result in wastewater that still contains dilute concentrations of the metal ions. These dilute solutions are often above EPA discharge limits. Unfortunately, these methods are not efficient for removal of metal from large volumes of wastewater, nor wastewater containing low levels of metal contamination. In addition, these methods have high costs in terms of equipment as well as the energy requirement of these processes. These processes result in relatively large volumes of hazardous by-products which in turn must be disposed of properly, thereby further increasing the cost of decontamination of wastewater.

Polyalkyleneimines such as polyethyleneimine have been used to separate target metal from an aqueous solution (see U.S. Pat. No. 5,766,478). As described in U.S. Pat. No. 5,766,478, these synthetic polymers are highly branched, and it is thought that the branched structure not only gives these polymers a globular nature, but also a high charge density which was thought to allow for better binding with metal ions within the polymer. Furthermore, while it is thought that other polyamines, such as polyvinylamine could be used as the backbone of the polymer, that linear molecules would have an inherent drawback in that overfunctionalization could lead to insolubility in different pH ranges.

New technologies in wastewater treatment have involved use of microbial biomass such as algae, bacteria, fungi, and yeast. Biomass metal absorption has been conducted with both viable and dead or inactive cells. In these systems, the metal ions bind to the outside of the cells in the biomass and in the case of living biomass may also be internalized into the cells. In addition, microbial polysaccharides such as chitosan have been used for the removal of heavy metals or precious metal recovery from aqueous solutions (Hsien and Rorrer, 1995, *Separation Science and Technology*, 30:2455–2475).

Despite these technologies, the need exists for a high throughput continuous, cost effective method for removing metal ions from dilute aqueous waste streams, such that the effluent meets EPA allowable discharge levels.

SUMMARY OF THE INVENTION

The present invention is drawn to a method for separating at least one metal cation of interest from an aqueous solution. The method comprises processing the aqueous solution containing the metal cation of interest using a tangential flow filtration apparatus in the presence of a charged biopolymer. The aqueous solution is processed by adding it to the reservoir of a tangential flow filtration apparatus. The apparatus contains a polymer containing solution, wherein the polymer comprises a linear anionic molecule. The concentration of said metal ion in resulting filtrate is less than that originally present in the aqueous solution. The processing is terminating prior to breakthrough of the metal ion of interest by stopping the flow of aqueous solution into the filter apparatus.

The present invention is drawn to a method for separating at least a portion of a metal cation component from an aqueous component of an aqueous solution. The method comprises combining an aqueous solution that includes an aqueous component and a metal cation component with a polymer solution. The polymer solution comprises a linear anionic polymer component. At least a portion of said cation component binds to said linear anionic polymer component of said polymer solution. The combined solutions are directed across a membrane, wherein said aqueous component migrates through said membrane to form a filtrate, thereby separating at least a portion of said cationic component from the aqueous component.

The present invention is further drawn to a method for separating at least a portion of a metal cation component from an aqueous component of an aqueous solution. The method comprises combining an aqueous solution that includes an aqueous component and a metal cation component with a polymer solution, whereby at least a portion of said cationic component binds to a linear anionic polymer component of said polymer solution, wherein said linear anionic polymer component comprises γ-polyglutamic acid (PGA). The combined solutions are directed across a membrane, wherein said aqueous component migrates through said membrane to form a filtrate, thereby separating at least a portion of said cationic component from the aqueous component.

The present invention is further drawn to a method for separating at least a portion of a metal cation component from an aqueous component of an aqueous solution. The method comprises combining an aqueous solution that includes an aqueous component and a metal cation component, wherein the metal cation component is present at a concentration of about 10 ppm with a polymer solution, whereby at least a portion of said cation component binds to a linear anionic polymer component of said polymer solution. The linear anionic polymer component comprises γ-polyglutamic acid at a concentration of about 0.5% grams per liter. The pH of the combined solutions is maintained at in a range of between about 4 and about 5. The combined solutions are directed across a membrane, wherein said aqueous component migrates through said membrane to form a filtrate thereby separating at least a portion of said cationic component from the aqueous component. The combined solutions can then be treated such that at least a portion of said γ-polyglutamic acid-metal complexes are precipitated from the combined solution, forming a precipitate and a supernatant.

The present invention involves the use of microbially produced γ-polyglutamic acid (PGA) in conjunction with tangential flow filtration. The process, also termed polymer enhanced diafiltration (PEDF), uses a γ-linked amino acid polymer that is produced in high yield from the fermentation of a member of the Bacillus genus of bacteria, in particular *Bacillus subtillus* or *Bacillus licheniformis*. The process of the present invention retains and concentrates metal ions from dilute waste streams. In one embodiment, the concentration of the other components of the combined solutions are not altered, e.g., the PGA remains at constant concentration. In another embodiment, where the process is run until PGA-metal complexes precipitate in the retentate, soluble PGA is maintained at a given concentration by the addition of PGA containing solution to the process. The process uses filtration technology at high throughput and is scalable.

Furthermore, due to the insolubility of γPGA-metal complexes at pHs of at least about 13, a further reduction in waste volume of at least about 10 fold is achieved through precipitation of the γPGA by elevating the pH of the PGA-metal complex containing solution, e.g., the retentate or combined solutions (or combination thereof, if they are combined). The supernatant obtained typically the same concentration as the initial waste stream can be further processed according to the method of the present invention. The polymer used in the process is safe, non-toxic, naturally produced and biodegradable. The polymer can be regenerated and the metal recovered using techniques such as solubilization followed by precipitation of the metal ion or techniques such as electroplating. In addition, if it is not necessary to regenerate the polymer, the precipitated polymer can be dried prior to disposal. The precipitate, comprising γPGA-metal complexes can also be treated to release the bound metal or, because the γPGA is non-toxic, the precipitate can be burned and the metal oxides recovered.

The process of the present invention results in at least about an 80-fold decrease in metal containing waste volume during the filtration step and an additional decrease of at least about 10 fold in the precipitation step. Resulting in an overall concentration of about 800 fold. In addition, the filtration process results in the retention of copper, lead or cadmium of at least 99%.

As described herein, a linear, microbially produced polymer, γPGA, is highly effective at removing metal ions from dilute aqueous solutions. Despite the expectation that a linear molecule would not function as well as a branched molecule, as demonstrated herein, a tangential flow filtration process using γPGA is able to remove copper, lead and cadmium ions to less than 1.3, 0.0015 and 0.005 ppm respectively. The metal binding capacity of PGA is extremely high. For example, the capacity of PGA for copper was greater than 180 mg/g of dry PGA, which is produced via a high yield fermentation process that results in recovered yields of greater than 50 g/l. The high binding capacity and high yield production are important factors in reducing the cost of removing metals from dilute aqueous solutions.

BRIEF DESCRIPTION OF THE DRAWINGS

FIG. 2 is a Table showing the permeation of copper during PEDF using a 10 mg/l copper feed solution the absence and presence of pre-diafiltration.

FIG. 5 is a Table showing the permeation of copper over permeate passed during two different PEDF experiments, both using a 10 mg/l copper feed solution in the presence of 2 g/l PGA batch AJF01.

FIG. 6 is a Table showing the permeation of copper over permeate passed during three different PEDF experiments, using a 10 mg/l copper feed solution in the presence of 2 g/l PGA batch AJF01, where TMP was manually adjusted during PEDF to stay within the experimental range and CFR was 160, 230, and 300 mL/min respectively.

FIG. 7 is a Table showing the permeation of copper over permeate passed during three different PEDF experiments, using a 10 mg/l copper feed solution in the presence of 2 g/l PGA batch AJF01, where TMP was manually adjusted during PEDF to stay within the experimental range and the PGA solution contained 0.1, 0.2 and 0.4 M NaCl respectively.

The foregoing and other objects, features and advantages of the invention will be apparent from the following more particular description of preferred embodiments of the invention.

DETAILED DESCRIPTION OF THE INVENTION

Diafiltration is a means of exchanging solutions in which a target compound is dissolved. A tangential flow filtration apparatus is used with a membrane pore size smaller than the target molecule. The solution containing the target molecule is circulated via a pump through the filter apparatus. Filtrate is removed and retentate is passed backed into the reservoir of the apparatus. At the same time, fresh buffer (the desired exchange buffer) is added to the reservoir, typically at the same rate as filtrate leaves the system. Generally, the reservoir volume is held constant and eventually, the "old buffer" and any low molecular weight contaminants are completely exchanged with the "new buffer", which was continuously pumped into the reservoir. Unlike conventional filtration processes, in tangential flow filtration, the solution to be filtered flows across the surface of a filter membrane in addition to passing through the filter membrane. Thus, the solution to be filtered and any large particles or molecules in the solution are swept across the filter membrane, allowing filtrate and any soluble components smaller than the pore size of the membrane to pass through. In this manner, concentration polarization, and accumulation of retained material at the membrane interface is more controllable and its negative effects, i.e., loss of flux, are reduced.

Polymer enhanced diafiltration (PEDF) is similar to conventional diafiltration in that a target molecule, in this case the polymer PGA, is circulated through the membrane apparatus and back into the reservoir. While metal waste is continuously pumped into the system at the same volume metric flow rate as filtrate leaves the system. The polymer is retained because it is larger than the membrane pore size. Heavy metals accumulate in the reservoir due to the charge interaction with PGA and also due to the presence of a relatively high concentration of the retained material (e.g., PGA) at the membrane interface, therefore, heavy metal contamination in the filtrate is reduced to well below the EPA discharge limits for metals.

Figure 12A:
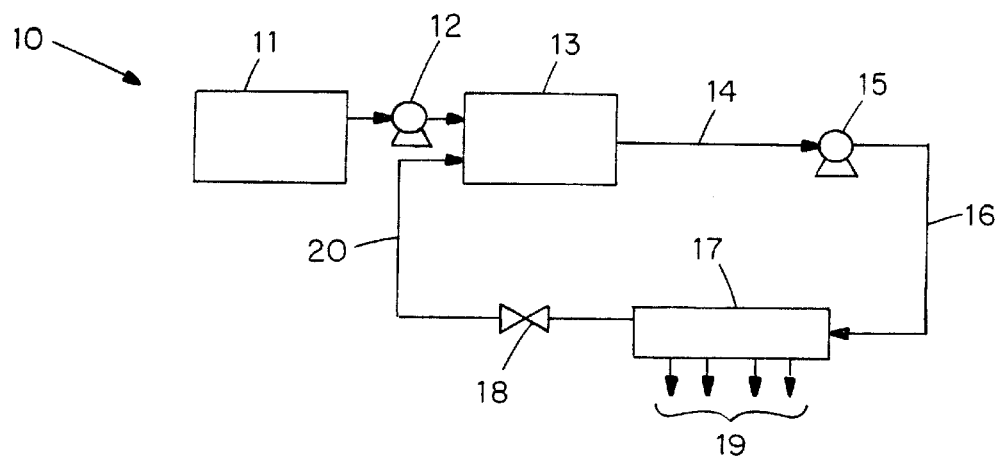
FIG. 12A is a schematic diagram of one embodiment of the present invention.

One embodiment is illustrated in FIG. 12A. Reference number 10 shows an embodiment where the aqueous solution, 11, is added to a polymer solution in a reservoir 13, using a pump, 12. The combined solution is directed across a membrane in a filtration apparatus, 17 via a connection, 14 and 16, also driven by a pump, 15. Transmembrane pressure is regulated by the pump, 15 and optionally by a two-way valve, 18, that can be used to restrict the flux from the filtration apparatus. The retentate leaves the filtration apparatus and is directed back into 13 via 20. At least some components of the combined solution passes through the membrane, forming a filtrate, 19.

Figure 12B:
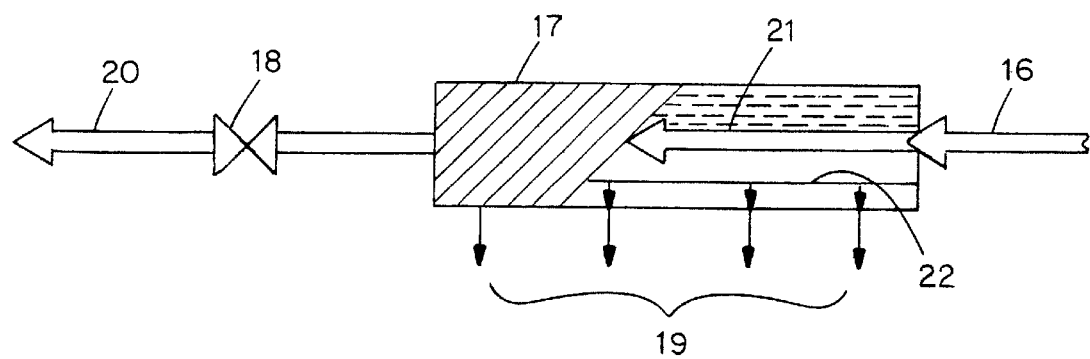
FIG. 12B is a cut-away of the filtration apparatus, 17.

A cross section of the 17 is shown in FIG. 12B. The combined solution enters 17 via 16 and contacts a membrane, 22. Bulk flow (21) of the combined solution is directed across 22, i.e., tangential to 22.

The present invention is further drawn to a method for separating at least a portion of a metal cation component from an aqueous component of an aqueous solution. The method comprises combining an aqueous solution that includes an aqueous component and a metal cation component with a polymer solution, whereby at least a portion of said cationic component binds to a linear anionic polymer component of said polymer solution, wherein said linear anionic polymer component comprises γ-polyglutamic acid (PGA). The combined solutions are directed across a membrane, wherein said aqueous component migrates through said membrane to form a filtrate, thereby separating at least a portion of said cationic component from the aqueous component.

The present invention is further drawn to a method for separating at least a portion of a metal cation component from an aqueous component of an aqueous solution. The method comprises combining an aqueous solution that includes an aqueous component and a metal cation component, wherein the metal cation component is present at a concentration of about 10 ppm with a polymer solution whereby at least a portion of said cation component binds to a linear anionic polymer component of said polymer solution. The linear anionic polymer component comprises γ-polyglutamic acid at a concentration of about 0.5% grams per liter. The pH of the combined solutions is maintained at in a range of between about 4 and about 5. The combined solutions are directed across a membrane, wherein said aqueous component migrates through said membrane to form a filtrate thereby separating at least a portion of said cationic component from the aqueous component. The combined solutions can then be treated such that at least a portion of said γ-polyglutamic acid-metal complexes are precipitated from the combined solution.

The present invention is drawn to a method for removing metal ions of interest from aqueous solutions containing low concentrations of the metal ions of interest. The method involves the use of a microbially produced polymer, γ-polyglutamic acid. In one embodiment of the present invention, a dilute aqueous solution such as a waste stream is fed in a continuous manner to a polymer containing solution. The combined solutions are directed across a membrane, wherein the membrane has a molecular weight cutoff such that the polymer and polymer-metal complexes are retained by the membrane in the retentate. At least a portion of the aqueous component passes through the membrane to form a filtrate wherein the filtrate has a lower concentration of the metal ions of interest compared to the starting aqueous solution. In one embodiment a tangential flow filtration apparatus is used to process the combined solutions. In another embodiment the aqueous solution is added to the polymer solution at the same rate that filtrate exits the system.

In one embodiment of the present invention, the concentration of metal ion of interest in the aqueous solution is about 40 ppm. In another embodiment, the concentration is 20 ppm. In still another embodiment, the concentration is 10 ppm.

In one embodiment of the present invention, the concentration of the metal ion of interest in the filtrate or permeate is less than about 1 ppm. In one embodiment, the metal ion of interest is copper ion. In one embodiment, the concentration of copper in the filtrate is less than 1.3 ppm. In another embodiment, the concentration of copper ions in the filtrate is about 0.003 ppm.

In another embodiment, the metal ion of interest is lead ion. In one embodiment, the concentration of lead ions in the filtrate is less than 0.015 ppm. In another embodiment, the concentration of lead ions in the filtrate is about 0.004 ppm.

In still another embodiment, the metal ion of interest is cadmium ion. In one embodiment, the concentration of cadmium ions in the filtrate is less than 0.005 ppm. In another embodiment, the concentration of copper ions in the filtrate is about 0.001 ppm.

In another embodiment, the metal ion of interest is, for example, mercury, nickel and zinc. In still another embodiment, the metal ions are radioactive isotopes. In yet another embodiment, a combination of said metal ions comprise the metal ions of interest.

PGA has a pKa of 3.6. Therefore, varying the pH of the aqueous solution, the polymer containing solution or the mixture of the two is expected to affect the ability of PGA to bind metal ions. As described herein, the mixture of the two solution is also referred to as the combined solutions. In addition, the mixture that is retained by the membrane is referred to as the retentate. In one embodiment, the retentate is directed back into the combined solutions, which is also referred to as the reservoir contents. Different metal ions are expected to have differing affinities for PGA. In one embodiment, the polymer containing solution and the aqueous solution have a pH of about 4.0. In another embodiment, the polymer containing solution and the aqueous solution have a pH of about 5.0. In still another embodiment, the pH of the reservoir contents is maintained at least about 4.0. In another embodiment, the pH of the reservoir contents is maintained at least about 5.0 during processing of the aqueous solution.

As described herein, PGA is an effective polymer to use in conjunction with PEDF to reduce metal ion content in aqueous solutions or to bind and concentrate metal ions of interest in a high throughput process. Previous results using PGA in "static" uptake of copper for example, revealed unremarkable binding affinity as measured quantitatively by $K_D$ from the Langmuir adsorption model. This assay involved the static uptake of copper by PGA and calculation of $K_D$ from the Langmuir isotherm using non-linear regression of the experimental data using SCIENTIST™. The static method used a semi-permeable membrane in which PGA was placed on one side of the membrane and a copper solution on the other. Due to the pore size selected, copper diffused across the membrane, effectively halving the concentration of copper. As PGA bound the copper it would have been removed from the system and the overall copper concentration would decrease. A low $K_D$ would indicate that the polymer binds metal ions even at low concentrations. However, the $K_D$ measured at pH 2.0, 3.0 and 4.0 was 63.6, 112.3 and 32.0 mg/l respectively, well above the EPA allowed maximum discharge. Furthermore the time required to reach equilibrium binding was more than four hours, indicating that PGA would not be effective for high throughput processing of waste water. Based on these results, it was unexpected that PGA could be used in a high throughput method to remove metal ions from an aqueous solution containing a dilute concentration of metal ions, e.g., less than 50 ppm to reduce the concentration to below 1.3 ppm. However, as demonstrated herein, PGA used in a PEDF process resulted in significant metal ion removal from even dilute aqueous solutions (e.g., 10 ppm) in high throughput with large volumes of waste water.

While not wishing to be bound by theory, even though the solution to be filtered is swept across the surface of the membrane, the bulk concentration of a retained molecule is expected to be somewhat less than the concentration of that molecule at the membrane surface. A so-called gel layer forms at the membrane interface resulting in higher PGA concentration than in the bulk retained species. This increase in concentration at the membrane surface could give PEDF an advantage over static process, since an effectively higher concentration is being used without the need to keep the entire solution at that concentration of PGA. This allows a lower concentration of PGA to be used which allows for greater pumping efficiency (i.e., less energy required to pump because the solution is less viscous). Another advantage of the PEDF system with PGA is that polymers, especially linear polymers such as PGA, tend to stretch out linearly in a flow stream, (such as the channels of a TFF membrane). With the polymer stretched out across the membrane surface, a sieving action may also be occurring, which is expected to increase the ability of large PGA molecules to remove dilute metal ions.

As described in the Exemplification, PGA from two different production batches resulted in dramatically different copper permeation curves. Two possible explanations for this phenomenon are as follows. As PGA binds metal or is placed into a solution of increasing ionic strength, the molecule is reduced in size, most likely due to the reduction in overall negative charge. As a result of the overall reduction in charge and complexation with metals, the molecule has more intramolecular interactions, thus effectively collapsing upon itself. As the intramolecular interactions increase, the solution viscosity decreases (fewer entanglements between molecules because the molecules are more globular and smaller). The effect during the PEDF process is that a PGA-metal complexes could actually "shrink" to the point where they could pass through the membrane (along with any metal it may be carrying). To test this theory, copper permeation was measured in the effluent during the PEDF process. A dramatic increase in copper concentration toward the end of the process, possibly representing breakthrough (the time at which all available binding sites on the ent are occupied, thus allowing metal ions to pass through the membrane) was detected. However, if true breakthrough had occurred, then the copper concentration in the effluent after breakthrough will be dictated solely by the inlet concentration (a constant) and various operational parameters (filtrate flow rate and reservoir volume). In other words, initially (at T=0), the copper concentration is zero and eventually will be equivalent to the inlet concentration (logarithmic approach). The effluent concentration after breakthrough can be calculated by performing a mass balance on the system:

$$C = C_0 \left[1 - e^{\frac{-ft}{V}}\right]$$

C is the concentration of copper in the effluent at any time t, $C_0$ is the inlet copper concentration (waste stream), f is the filtrate flow rate and V is the reservoir volume.

Figure 1:
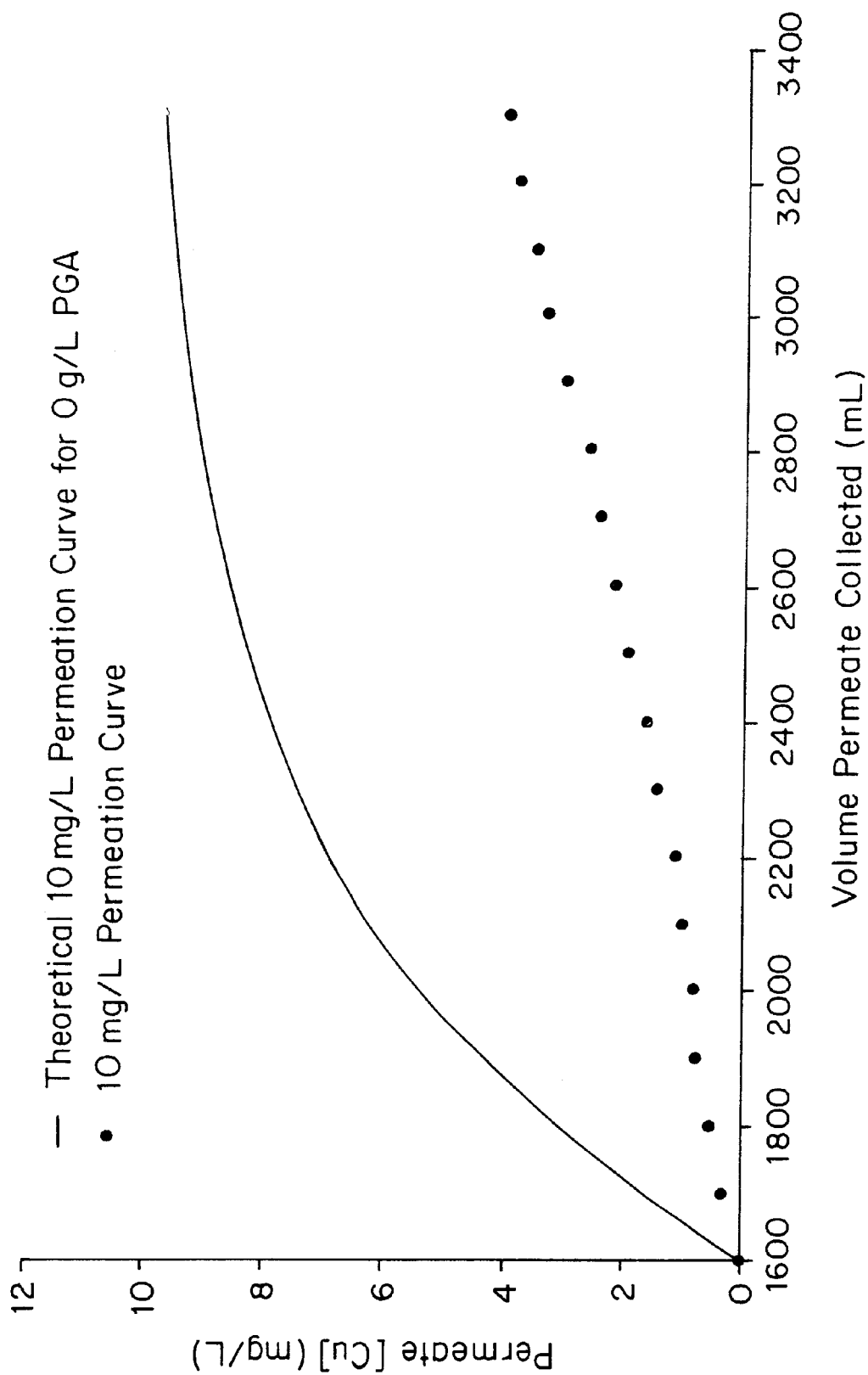
FIG. 1 is a graph comparing a theoretical permeation curve (solid line) and actual permeation (curve dotted line) during PEDF with 10 mg/l copper feed solution and starting at the point of breakthrough (1600 mL).

This equation was applied to several "breakthrough" curves, resulting in a true breakthrough curve for copper which in all cases was well above (i.e., predicted a higher concentration) than the experimental curve (FIG. 1). This indicates that as copper passed through the membrane in increasing concentrations, copper binding to PGA was still occurring. Therefore, it appears that some other phenomenon was at least in part responsible for the passage of copper.

Another possibility for the initial passage of copper lies in the fact that biopolymers are naturally produced as a distribution of molecular weights. Polydispersity is a term describing the distribution of molecular weights on a log scale. Polydispersity is equal to the weight average molecular weight (Mw) of a given polymer divided by the number average molecular weight (Mn). The polydispersity for naturally produced biopolymers is rarely less than 1.4 and can be as high as 2.0. Batch AJF01 PGA was used in most of the experiments described herein. The molecular weight of AJF01 was measured by SEC-MALLS and found to be $1.5 \times 10^6$ g/mol. The polydispersity was also measured using SEC-MALLS and found to be 1.44. Initial purification of the polymer for use in PEDF involved a dialysis step using 12,000–14,000 MWCO dialysis membrane (Spectra Por). This process results in PGA molecules ranging in size from high molecular weight (greater than $1.0 \times 10^6$ Da) to very low molecular weights around 12,000–14,000. The amount of this low molecular weight material is defined by the polydispersity of the initial sample and the average molecular weight. Therefore, to remove PGA molecules capable of passing through the 100K membrane during PEDF, a pre-diafiltration step was performed. This pre-diafiltration comprised a PEDF process performed prior to introduction of any copper solution to the system and the system was operated in conventional diafiltration mode. Water was pumped into the system at the same rate as filtrate was removed. In this manner, low molecular weight PGA present from the initial purification of PGA was effectively removed. The results from this experiment are shown in FIG. 2.

Based on these analyses, one of ordinary skill in the art can optimize metal ion retention by optimizing the size of the polymer used in PEDF in relation to the pore size of the membrane used in PEDF. This optimization can include for example, use of higher MWCO dialysis or ultrafiltration in the purification of the polymer, or use of prediafiltration prior to the addition of the metal containing solution, or optimization of ionic strength of the polymer or metal containing solution such that the polymer is not allowed to shrink to the point of passing through the membrane and combinations thereof. In one embodiment, the polymer is purified using a 100,000 Da MWCO membrane or dialysis tubing and the PEDF membrane is 30,000 Da. In another embodiment, the polymer is purified using a 300,000 Da MWCO membrane or dialysis tubing and the PEDF membrane is 100,000 Da. In another embodiment, the polymer solution contains 0 M to about 0.1 M NaCl.

Using the methods described herein, PGA having a weight average molecular weight of at least about 850,000 and up to $2.5 \times 10^6$ Da has been produced. In one embodiment of the present invention, the PGA solution comprises PGA having a weight average molecular weight of at least about 850,000 Da. In another embodiment of the present invention, the PGA solution comprises PGA having a weight average molecular weight of at least about $1 \times 10^6$ Da. In another embodiment of the present invention, the PGA solution comprises PGA having a weight average molecular weight of at least about $2.5 \times 10^6$ Da.

The PEDF process as described herein is scalable and can use large scale membranes from the water purification and dairy industries, for example on the scale of 100 ft² area per membrane (membranes used in this study were 0.25 ft² and 1 ft²). TFF as a technology is generally scalable and for a filter area of about 100 ft², approximately 400,000 liters of dilute metal waste could be processed using about 200 grams of PGA, an amount which can be made from as little as 4 liters of fermentation broth using methods described herein (current yield 53 g/l). In one embodiment of the present invention, the PGA solution comprises PGA at a concentration of about 1 g/l. In another embodiment of the present invention, the PGA solution comprises PGA at a concentration of about 2 g/l. In another embodiment of the present invention, the PGA solution comprises PGA at a concentration of about 4 g/l. In another embodiment of the present invention, the PGA solution comprises PGA at a concentration of about 5 g/l.

In order to operate in a continuous mode, a parallel PEDF system could be used with a bypass valve to direct flow of waste to one of a pair, for example, of equivalent PEDF systems. Once breakthrough is approached in one system (for example, as indicated by transmembrane pressure (TMP) fluctuations or by on-line metal ion sensors), the valve could direct flow to the other system, bypassing the first system for regeneration or replacement. During operation, the off-line system can be regenerated to either recover metals through conventional means or to recover metals and PGA. The combined solution is processed as necessary or desired. Potential processes to recover the metal could include, for example, electroplating of the metals after solubilization of the metal PGA complex. Metals can also be selectively eluted from the polymer by varying the pH. Metals could also be recovered by burning the complex and recovering the resulting in metal oxides. In another embodiment, the combined solution is treated such that the PGA-metal ion complexes precipitate. The precipitate can then be separated from the solute, for example by centrifugation. In one embodiment, the pH of the combined solution is raised to about 13.

In another embodiment, the method of the present invention can be run until the PGA-metal ion complexes precipitate while in the filter apparatus. In this embodiment, the membrane comprises a material that can withstand high back pressure, such as a ceramic material. In one embodiment, the membrane is a Ceraflo ceramic Ultrafiltration membrane. When the membrane fills with precipitate such that flux is decreased, the addition of aqueous solution can be briefly terminated and the membrane subjected to a brief back pulse of air to dislodge the precipitate, such that it can be collected downstream of the filter on the retentate side of the filter, e.g., within the retentate loop. In this method, fresh PGA solution is added using the process to replace the precipitated PGA.

Using standard techniques of optimization to maximize filter use while minimizing the need for pumping capacity, experiments were performed to test the effect of varying TMP with constant CFR. An optimum TMP was determined for the MiniTan filtration apparatus which was then used to find optimal CFR. These techniques are well known in the art an can be used to optimize use of any suitable filtration apparatus of the method of the present invention. As described in the Exemplification, a range of TMP from 7 to 22 PSI did not substantially affect the ability of PGA to bind metal ions using a given apparatus. In addition, a range of CFR from 160 to 300 mL/min. did not substantially affect the ability of PGA to bind metal ions using a given apparatus. It is important to optimize the filtration conditions a small scale and then scale up because of the expense of filtration membranes and pumping capacity. As described herein a range of TMP and CFR can be used to optimize flux (filtration flow rate) while maintaining very low levels of metal in the permeate. Conventional optimization techniques did not affect metal retention efficiency; therefore, one of ordinary skill in the art would be able to scale up the method of the present intention using routine optimization procedures.

It is understood that the optimal TMP is dependent upon parameters such as membrane geometry, membrane composition and temperature among other factors. One of ordinary skill in the art would be able to optimize the process and use the optimized parameters in scale-up, particularly using larger membranes with similar geometry and composition. Furthermore, it is understood that while optimizing for high throughput and low metal concentration in the filtrate are desirable, these two parameters are often balanced against each other, i.e., slightly more discharge of metal is tolerated (providing it is still under EPA limits) in order to obtain higher throughput.

EXEMPLIFICATION

Production of PGA:

PGA was produced essentially as described by Fowler et al. (1998) and Stock (1996 Masters Thesis, Worcester Polytechnic Institute). Briefly, the bacterial strain *Bacillus licheniformis* ATCC 9945 was fermented in a Bioflow III (New Brunswick Scientific) in a five liter fermentation vessel. A primary seed flask was incubated with growth medium consisting of 10 g/l peptone, 2 g/l yeast extract, 0.02 g/1MgSO$_4$.7H$_2$O) at 250 RPM and at 37° C. for approximately 6–8 hours, or until an optical density measured at 600 nm of approximately 1.0 was reached. Primary seed flask containing production medium could also be used; the pregrowth phase in this medium is about 24 hours. Four percent of the primary seed culture was aseptically transferred to the fermentation vessel containing production medium. Production medium consisted of:

| | |
|---|---|
| 80 g/l glycerol | 0.5 g/l K$_2$HPO$_4$ |
| 50 g/l citrate.H$_2$O | 0.5 g/l MgSO$_4$.7H$_2$O |
| 50 g/l L-glutamate | 0.08 g/l MnSO$_4$.H$_2$O |
| 8.63 g/l NH$_4$SO$_4$ | 0.15 g/l CaCl$_2$.2H$_2$O |

The fermentation was incubated for approximately 96 hours and then the culture was harvested for PGA purification. Using this method, three batches of PGA were produced. These batches are referred to as AAD01, AJF01, and SSM001 respectively.

PGA was then separated from the bacterial cells. The fermentation broth was diluted 1:1 with a 0.2 M citrate solution and the pH was adjusted to 3.0 to facilitate separation. The broth was centrifuged at 10,000×g for 20 minutes. After centrifugation, the supernatant was decanted and the pellet was discarded. The pH of the supernatant was adjusted to 7.0.

The cell-free PGA solution was then dialyzed. It was necessary to dialyze the cell free PGA at bench scale in batches. Spectra Por dialysis membrane with a molecular weight cutoff (MWCO) of 12,000–14,000 was used throughout. Dialysis tubing was cut to the approximate length of a 40 liter carboy and soaked in dH$_2$O for 5–10 minutes. The dialysis tubing was then filled with 150 mL of cell-free PGA and closed with dialysis clips. At 3-hour intervals, the entire 40 liters of dialysis buffer was exchanged with fresh buffer. The first three buffer exchanges used 2 mM EDTA, to remove divalent cations. This was followed by three buffer exchanges using dH$_2$O. The last dH$_2$O exchange was left overnight, after which the dialysis dialyzed samples were removed from the tubing. Over the course of the 24-hour dialysis at 4° C., the total volume in each dialysis tube increased approximately three-fold.

The dialyzed PGA was then shell-frozen in the appropriate vessel using an acetone/dry ice bath. The shell-frozen PGA was lyophilized using a Virtis 12 liter automatic freeze dryer. Lyophilization was performed over approximately 48 hours, or as long as necessary to complete the process. Lyophilized PGA was stored in 50 mL conical tubes in a desiccator at −20° C. until use.

Molecular weight and polydispersity were measured using size exclusion chromatography coupled with multi-angle laser light scattering (SEC-MALLS). The elution conditions were: 0.3 mL/min. mobile phase flow rate. The mobile phase was 0.1 M citrate buffer, pH 2, the column used was a waters Ultrahydrogel HPLC column at room temperature (25° C.). A sample concentration of 2 mg/mL in 0.2 M phosphate buffer (pH 4.0) was used and 300 μL of the sample solution was injected. Batch AAD01 had a mass average molecular weight of 0.85×10$^6$ g/mol. Batch AJF01 had a mass average molecular weight of 1.5×10$^6$ g/mol and a polydispersity of 1.44 +/−0.054. Batch SSM001 had a mass average molecular weight of 2.5×10$^6$ g/mol.

Heavy Metal Uptake Studies Using PGA in a Polymer-enhanced Diaflitration System:

Except as noted otherwise, for the PEDF experiments described herein, a Minitan™ Ultrafiltration System (Millipore Corporation, Bedford, Mass.) was fitted with two of the appropriate (ultrafiltration or microporous) Minitan filter plates as instructed in the installation and operation instruction manual provided by Millipore. The type and MWCO of the filter plate used depended on the particular experiment. PharMed® Masterflex tubing (Cole Palmer, Catalogue No. E-06485-15) was connected to the inlet of the Minitan system. A glass reactor vessel was connected to the other end of the tubing. The PGA solution comprising the appropriate batch of PGA dissolved in dH$_2$O and adjusted to the appropriate pH was added to the system through this vessel. The contents of the reactor vessel were stirred using a stir bar and a magnetic stir plate. The PGA solution was circulated through the Minitan system using a peristaltic pump (Millipore Corporation) fitted with a model 7015-20 pump head (Cole Palmer). The copper solution was pumped into the reactor vessel using a second peristaltic pump (Millipore Corporation) fitted with a model 7014-20 pump head (Cole Palmer) and PharMed® masterflex tubing (Cole Palmer, Catalogue No. E-06485-14).

Diafiltration was conducted at room temperature (25° C.). An integrity test and clean water flux test were performed as described in the Millipore Tangential Flow Systems Manual prior to each experiment. After introducing the PGA solution into the reactor vessel, it was circulated through the system for approximately 15 minutes prior to the introduction of copper to allow for equilibration with the membrane. During this time the system was operated in total recycle i.e. filtrate and retentate streams were directed back into the reservoir, (no volume change). After the 15 min. equilibration time, the filtrate line was removed from the reservoir and copper solution was added to the reactor vessel at a flow rate equaling the filtrate flow rate, in order to maintain a constant reactor vessel volume throughout the PEDF process. This was accomplished by manually adjusting the pump that controlled the addition of the copper solution to the reactor vessel. Unless otherwise stated, PEDF was conducted until the entire volume of copper solution had entered the system. Unless otherwise stated, the copper solution was 2.5 liters. The PGA solution was typically 500 mL. Permeate samples (5 mL) were collected for every 100 mL of solution filtered. The samples were later analyzed for copper concentration by the bathocuproine method as described below. In addition, at each sampling interval, the value of transmembrane pressure (TMP), filtrate flow rate (flux) and cross flow rate (CFR) were measured.

Copper solutions were prepared using analytical grade CUSO$_4$.5H$_2$O. A 1000 mg/l stock solution was prepared by dissolving 3.93 g of CUSO$_4$.5H$_2$O in 1 liter of dH$_2$O. The solution was adjusted to a pH of 4.0. Experimental copper concentrations of 10 mg/l, 20 mg/l and 40 mg/l were prepared by diluting the stock solution in the appropriate volume of dH$_2$O and readjusting the pH to 4.0 as necessary.

Copper concentration was determined using a modification of the bathocuproine method described in Standard Methods For The Examination of Water and Waste Water (Eton, et al, 1995 APHA, Washington, D.C). All absorbency measurements were made using a DU-64 spectrophotrometer (Beckman Instruments, Inc., Fullerton, Calif.). For these measurements, the tubes were acid washed and all samples were done in duplicate. Samples estimated to contain approximately 10 μg of copper were assayed. The volume used is referred to below as "sample volume". The sample volume was brought to a total volume of 5 mL with dH$_2$O. In addition, 5 mL samples of dH$_2$O were measured as a blank and 3 standards were measured comprising 10 μL of the standard copper solution brought up to a total volume of 5 mL using d H$_2$O. 100 μL of a 1:1 concentrated HCl:H$_2$O solution was added to each tube. 500 μL of NH$_2$OH.HCl was added to each tube. 500 μL of a 30 percent sodium citrate solution was added to each tube. 500 μL of NaBathocuproine ($C_{26}H_{18}N_2O_6S_2Na_2$) was added to each tube. Each tube was vortexed and was incubated at room temperature for at least 10 minutes but no longer than 60 minutes. The absorbence at 484 nm was read. The concentration of copper was calculated as follows:

"Factor" was calculated as follows:

$$\text{Factor } (\mu g/A_{484}) = \frac{\text{amount of copper in standard } (\mu g)}{\text{average } A_{484} \text{ of the 3 standards } (A_{484})}$$

The $A_{484}$ of the duplicate samples were averaged. The copper concentration was then calculated using the following equation.

$$[\text{Cu}] \ (\mu g/mL) = \frac{\text{Factor } (\mu g/A_{484}) * A_{484} \text{ of sample}) \ (A_{484})}{\text{Sample volume in mL}}.$$

Figure 3:
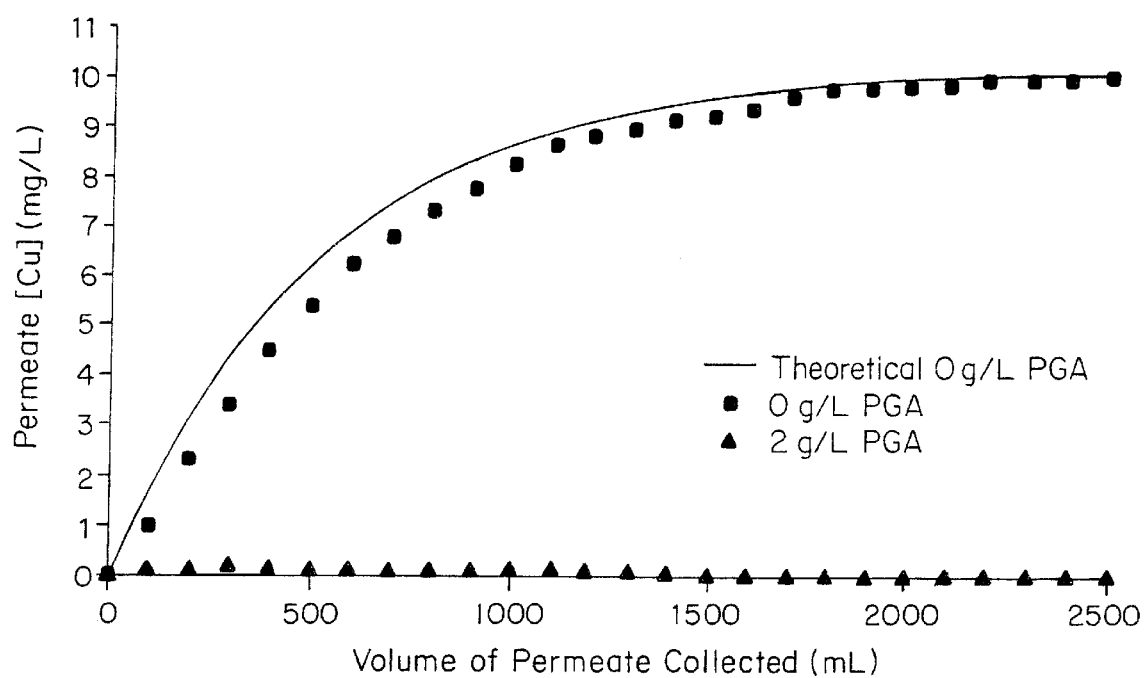
FIG. 3 is a graph of copper permeation curves, where the solid line is a theoretical curve in the absence of PGA, squares are actual permeation in the absence of PGA and triangles are actual permeation in the presence of 2 g/l PGA, where 500 mL of a 2 g/l solution of PGA (batch AJF01) having pH 4.0 and at 25° C. where CFR was 230 mL/min, TMP was between 12–17 PSI and the initial pH of the copper feed solution was 4.0.
Figure 4:
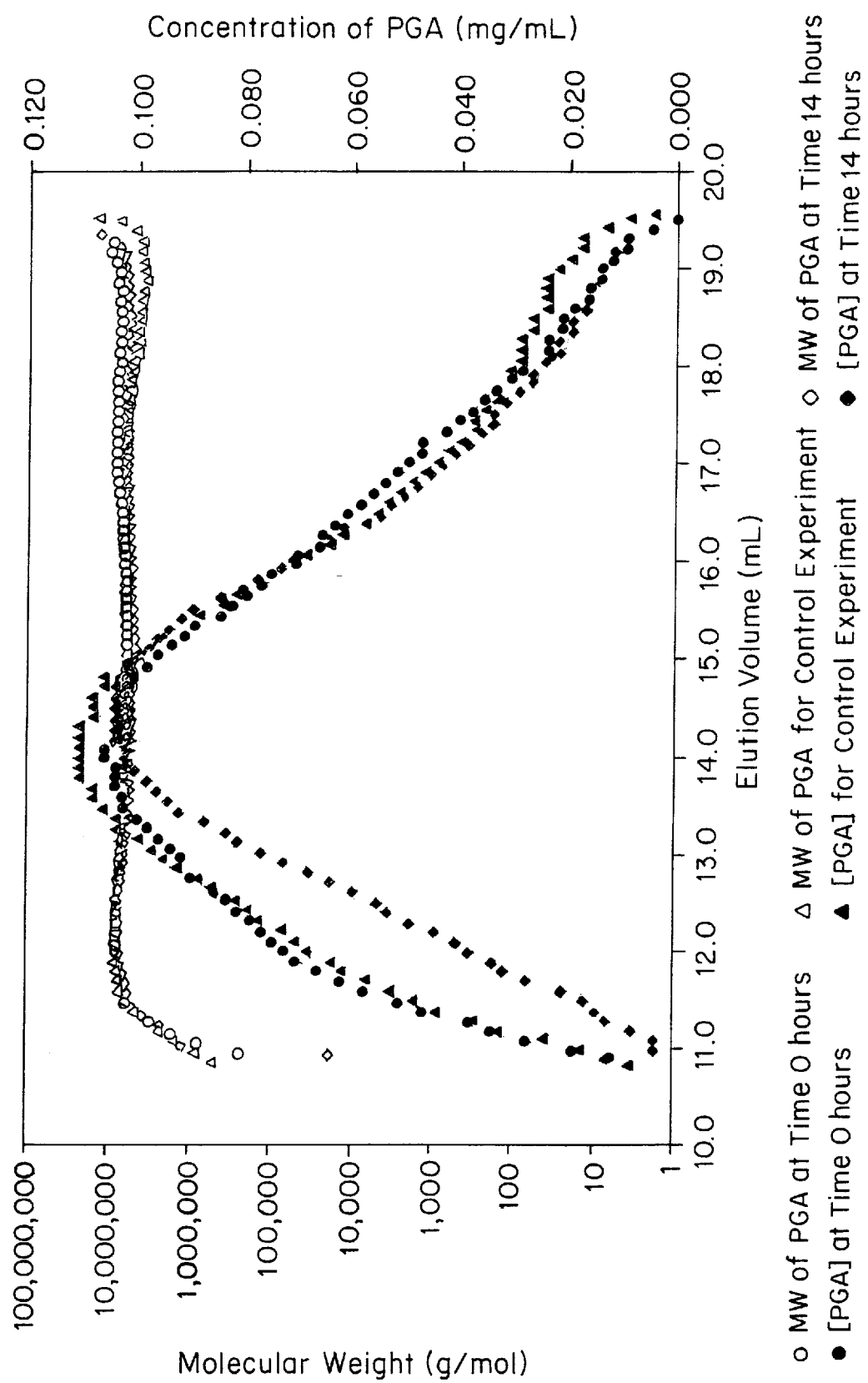
FIG. 4 shows the effect of the tangential flow filtration process on the molecular weight of PGA versus elution volume, where the circles represent samples taken before processing, diamonds represent samples taken after 14 hours of processing and triangles represent samples taken after 14 hours in the absence of processing (the polymer solution was incubated in a stationary beaker for 14.5 hours at 25° C.

For the majority of the examples of the PEDF process described herein, a 500 mL solution of 0.2% (w/v) PGA in water was made. The pH was adjusted to 4.0 and circulated through the membrane of the tangential flow filtration (TFF) apparatus at a cross-flow rate of approximately 100 mL/min. The TFF apparatus was fitted typically with a 100K molecular weight membrane (regenerated cellulose) and the total membrane area for the initial experiments was approximately 0.25 ft². The inlet pressure was set to 12–14 PSI by adjusting the resistance at the outlet of the filter apparatus. Transmembrane pressure was calculated according to the following equation:

$$TMP = \frac{P_i + P_0}{2} - P_f$$

where $P_i$ is the inlet pressure, $P_0$ is the outlet pressure and $P_f$ is the filtrate pressure (which is 0 for this process). A copper solution of 10 ppm (as copper sulphate) was pumped into the reservoir at the same rate as the filtrate flow rate in order to maintain a constant reservoir volume. Samples were collected and analyzed as described above. The system was also operated in the absence of PGA to determine whether there was significant bonding of metal by the membrane. As shown in FIG. 3, the membrane had a slight affinity for copper, but not enough to account for the 95% or greater removal of copper that was achieved during the process. The pH of the reservoir decreased from 4.0 initially, to as low as 3.4 at the end of the process. In addition, as shown in FIG. 5, there was a slight increase of the copper concentration in the filtrate early in the process which decreased to less than 0.23 mg/l. In the above described experiments using a total of 1 gram of batch AJF01 PGA, 1.42 mg and 1.60 mg of total copper had passed in the permeate in two separate runs. Based on these values, 17.33 mg and 17.51 mg of total copper was retained by the PGA in these two experiments.

Processing of PGA in the TFF apparatus did not affect the molecular weight of the molecule. Batch SSM001 (2 g/l) was processed for 14.5 hours. As shown in FIG. 2, after 14 hours of "processing" in the PEDF system, there was no effect on the polymer in terms of molecular weight loss due, for example, to shearing of the polymer.

The majority of the copper that passed through the membrane passed early during the process, within the first 1400 mL of the PEDF run. For example for one of the experiments, 1.22 mg of the total 1.42 mg of copper passed within the first 1400 mL. Therefore the first 1400 mL accounted for at least 86% of the total copper passed. To determine the reason for the initial passing of copper early in the PEDF run the effect of various parameters was tested as described below.

The Effect of Transmembrane Pressure:

Using the same amount of PGA from batch AJF01 and the same concentration of copper solution both at pH 4.0, TMP was varied using a low TMP of 8–10 PSI, a mid-range of 12–17 PSI (control) and a high range of 20–22 PSI. Copper permeation curves revealed that at all TMP's tested, copper passage occurred early in the PEDF run. The high and low TMP experiments had slightly more copper passage in this period; however, the copper passage for the high and low TMP experiments, like that for the control TMP experiment, lasted for approximately the first 1500 mL of the PEDF process, followed by significant reduction in copper passage for the remainder of the process. Like the control TMP experiment, approximately 89% and 97% of the copper that passed in the low and high TMP experiments occurred during the first 1500 mL of each process. Thus it appears that TMP can be varied from about 8 to about 17 PSI without significantly affecting the ability of PGA to bind metal ions.

Effect of Cross Flow Rate:

Using the same amount of PGA from batch AJF01 and the same concentration of copper solution, both at pH 4.0, the effect of cross-flow rate (CFR) on copper permeation was determined. TMP was manually adjusted to remain within the range of 12–17 PSI. like the initial experiments shown in FIG. 5. CFR was tested at 160 mL/min, 230 mL/min, and 300 mL/min. As shown in FIG. 6, the majority of the copper passed during the first 1500 mL of permeate collected at all three CFRs tested. Approximately 86% and 85.6% of the copper passed within the first 1500 mL for the CFR of 160 mL/min and 300 mL/min respectively for the 0.25 ft² Minitan membrane used in this study. Thus, it appears that CFR can be varied from about 160 to about 300 mL/min. without significantly affecting the ability of PGA to bind metal ions.

Effect of Ionic Strength:

Using the same amount of PGA from batch AJF01, the PGA was dissolved in a solution comprising 0.1, 0.2 or 0.4 M NaCl. As shown in FIG. 7, increase in copper permeation was directly correlated to increase in ionic strength. While the general rate and duration of the copper permeation of all three salt concentrations was generally the same for the three concentrations of NaCl, more copper passage occurred at the higher concentrations of salt. Maximum copper permeation was 2.3 mg/l, 3.0 mg/l, and 3.9 mg/l for the increasing concentrations of salt respectively. The peaks of permeation occurred at 400 mL, 500 mL, and 600 mL respectively. However, like previous permeation experiments, the copper passage at all three salt concentrations decreased to low levels after the initial permeation of copper.

Effect of Pre-diafiltration:

Experiments using PGA having much higher molecular weight ($2.5 \times 10^6$ g/mol, batch SSM001) did not reveal the same rate of initial copper permeation. Therefore, the effect of pre-diafiltration to remove small molecules of PGA that might be in the AJF01 batch was tested. Prior to the PEDF process described above (the same amount of PGA at the same pH and with 10 mg/l copper solution at pH 4.0), the PGA was processed using $dH_2O$ instead of the copper solution (pre-diafiltration). The pre-diafiltration was performed at a cross-flow rate of approximately 350–400 mL/min and a TMP between 7–10 PSI. The pre-diafiltration was run for approximately 1.5–2 hours using 1.3–2.0 liters of $dH_2O$ or as long as deemed necessary to remove all smaller molecular weight PGA. After pre-diafiltration, the PEDF was run using a 10 mg/l copper feed solution at pH 4.0 As shown in FIG. 2, the initial permeation rate of copper was greatly reduced in the pre-diafiltered experiment. A total of 0.31 mg of copper passed in the permeate. In comparison a total of 1.60 mg of copper passed when there was no pre-diafiltration of batch AJF01. Therefore, pre-diafiltration was used in all subsequent experiments prior to the introduction of copper to the process.

Effect of Membrane and Pore Size on Copper Uptake:

PEDF experiments with three different membrane pore sizes: 100,000 MW Ultrafiltration Membrane, 300,000 MW Ultrafiltration Membrane and 0.1 μm microporous membrane were performed using a 2 g/l PGA AJF01 solution at pH 4.0 together with a 10 mg/l copper feed solution also at pH 4.0. The operating conditions for TMP and CFR for the respective membranes were determined. For the 300K membrane, the optimum TMP and CFR were 4.85 PSI and 160 mL/min respectively. For the 0.1 μm membrane, the optimum TMP and CFR were 3 PSI and 145 mL/min respectively. The optimum TMP and CFR conditions used for the 100K membrane were determined as described above and were 9.0 PSI and 180 mL/min respectively.

The three membranes demonstrated different levels of copper passage. The 100K membrane demonstrated excellent recovery of copper having a permeation curve that started at the peak of 0.238 mg/l and diminished over time from this concentration reaching low to undetectable levels of copper. The 300K and 0.1 μm membranes demonstrated progressively more copper permeation, possibly due to a shrinkage of PGA-copper complexes which then passed through the membrane. For the 300K membrane, copper permeation started at 0.131 mg/l and remained somewhat level until 1100 mL, where copper permeation increased to 0.508 mg/l. Copper permeation reached levels as high as 1.213 mg/l toward the end of the experiment at 2300 mL. For the 0.1 μm membrane, copper permeation was initially 0.302 mg/l and increased to 0.503 mg/l by 500 mL and reached levels as high as 2.164 mg/l by the end of the experiment which was 2100 mL.

Effect of PGA Solution Concentration:

Experiments were conducted where the concentration of PGA was varied. PGA solutions of 1 g/l, 2 g/l, and 4 g/l were used with a 10 mg/l copper feed solution at pH 4.0. The permeation curves using 2 g/l and 3 g/l PGA demonstrated little copper passage throughout the process. However, for the experiment using 1 g/l PGA, copper passage after collecting 700 m/l of permeate increased significantly. The initial copper permeation for the 1 g/l experiment was 0.229 mg/l and remained relatively stable for 700 mL having increased to 0.261 mg/l. However, after 700 mL the copper permeation increased significantly to a final level of 4.314 mg/l at the end of the experiment. In contrast, for the 2 g/l experiment, copper permeation started at the highest level of 0.236 mg/l and decreased over the remainder of the experiment reaching very low to undetectable levels. Similarly for the 3 g/l experiment, copper permeation started at the highest level of 0.208 mg/l and decreased over the course of the experiment to low levels, ending at a concentration of 0.156 mg/l. The 3 g/l experiment was run for 4000 mL.

Effect of Influent Copper Concentration:

The effect of copper concentration in the system was tested using the standard operating procedure of 2 g/l PGA with a 100K membrane, where the solutions were at pH 4.0 and the TMP and CFR were 9.0 PSI and 180 mL/min respectively. Copper solutions were tested at 10 mg/l, 20 mg/l and 40 mg/l. The control experiment, using 10 mg/l copper feed solution, demonstrated little copper permeation throughout the entire experiment. In contrast, the experiment with 20 mg/l demonstrated copper permeation starting at 1900 m/l. In addition, the initial copper permeation for the 20 mg/l experiment was 0.365 mg/l compared to 0.236 mg/l for the 10 mg/l experiment. Copper permeation for the 20 mg/l experiment increased to a final value of 1.495 mg/l after 2400 mL. Likewise, in the 40 mg/l experiment, copper permeation was initially higher than for the control experiment and was 0.542 mg/l. This permeation level remained relatively steady until 900 mL, where it started to increase to a final value of 9.763 mg/l at 1500 mL. The 40 mg/l experiment was terminated at 1500 mL due to severely reduced flux rates.

Effect of PH of Starting Solutions

The effect of pH of starting solutions on copper uptake was measured by performing PEDF with 2 g/l PGA and a 10 mg/l copper feed solution, both adjusted to the appropriate experimental pH, either 4.0 or 4.5. Both experiments displayed very little copper passage for the first 2300 mL of the experiment. At 2300 mL, the pH 4.0 experiment demonstrated increased copper permeation, while the pH 4.5 demonstrated no increase in copper permeation. The pH 4.5 experiment did not show any increase in copper permeation for the duration of the PEDF experiment which was 4200 mL.

For the pH 4.0 experiment, copper permeation was initially 0.293 mg/l and decreased to as low as 0.017 mg/l. However, by 2300 mL of permeate collected, copper permeation had increased to 0.534 mg/l and after 3900 mL, the end of the PEDF run, the copper permeation reached a level of 4.034 mg/l. In contrast, for the pH 4.5 experiment, copper permeation started at 0.351 mg/l and decreased over the course of the experiment to 0.234 mg/l until 4200 mL of permeate had been collected. During the course of the pH 4.5 experiment, the permeate copper concentration fell to as low as 0.083 mg/l. Based on the amount of total copper permeated, 28.72 and 33.83 mg of copper was retained by the PGA in the pH 4.0 and pH 4.5 experiments respectively.

Figure 8:
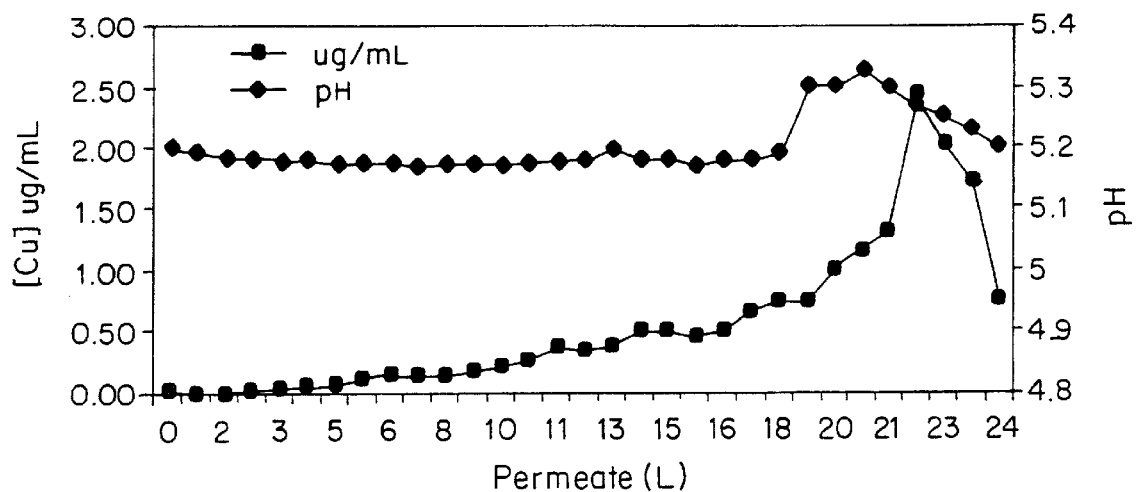
FIG. 8 shows a chart of copper permeation (squares) and pH of reservoir contents (diamonds) versus volume of permeate passed, where the pH of the reservoir contents were manually adjusted to about pH 5.

Effect of PH Control of Reservoir Contents:

The effect of maintaining the pH of the reservoir volume at 5.0 using 1 M NaOH was tested. The experiment was performed with 2 g/l PGA and a 10 mg/l copper feed solution both adjusted to pH 5.0. Copper permeation was measured over the course of collecting over 20 liters of permeate. As demonstrated in FIG. 8, the capacity of PGA increased dramatically when compared to previous experiments (where 5 liters or less was processed). The gradual increase in copper concentration in the permeate over time indicated that PGA-copper complex may still pass through the membrane possibly due to shrinking of the molecule-copper complex.

Figure 9:
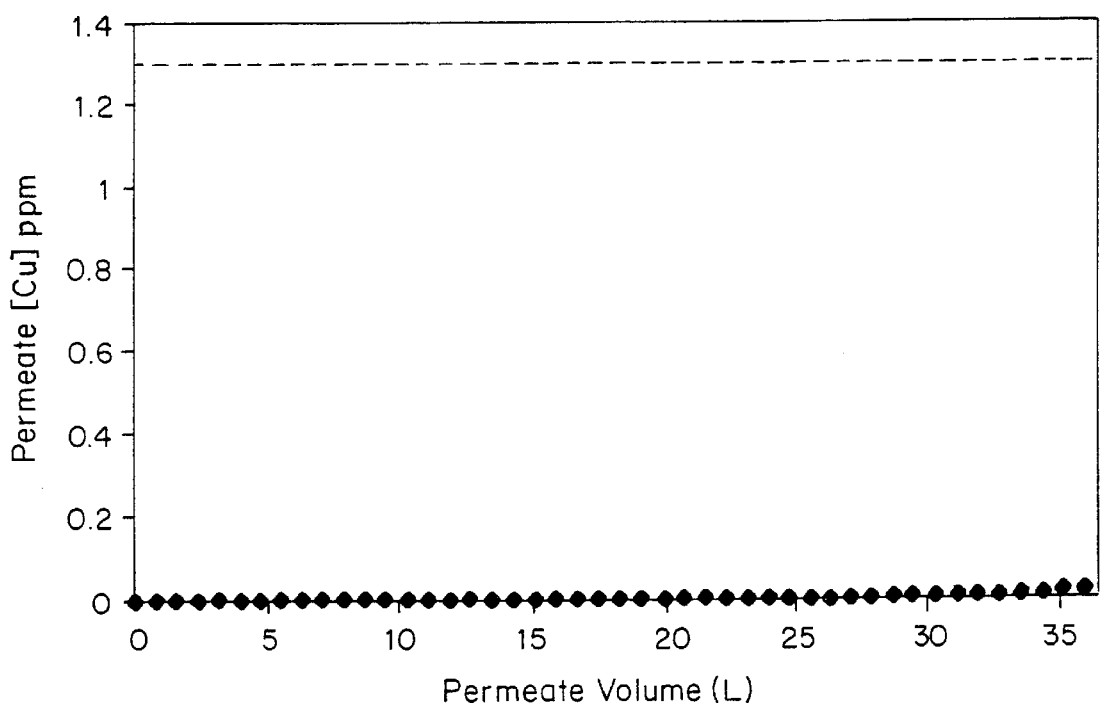
FIG. 9 shows PEDF with 4 g/l PGA in a 0.5 liter reactor at a CFR of 180 mL/min, TMP of 9.0 PSI and 10 ppm copper where the dotted line shows the EPA maximum discharge allowed for copper (1.3 ppm).
Figure 10:
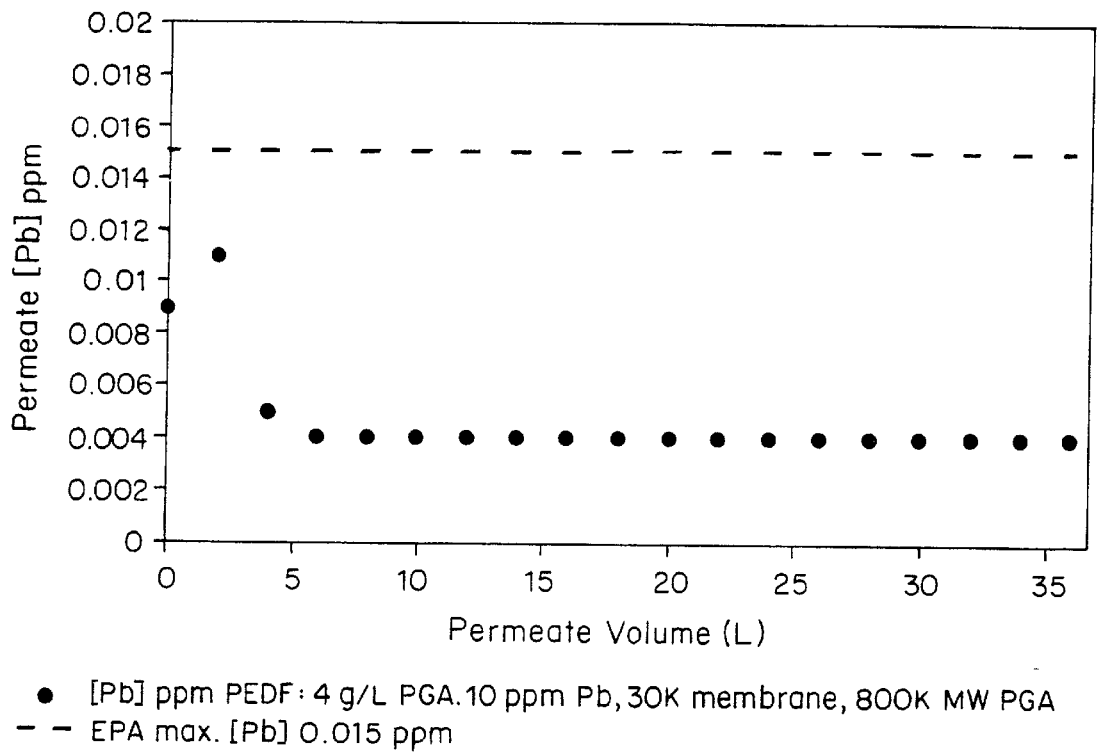
FIG. 10 shows PEDF with 4 g/l PGA in a 0.5 liter reactor at a CFR of 180 mL/min, TMP of 9.0 PSI and 10 ppm lead where the dotted line shows the EPA maximum discharge allowed for lead (0.015 ppm).
Figure 11:
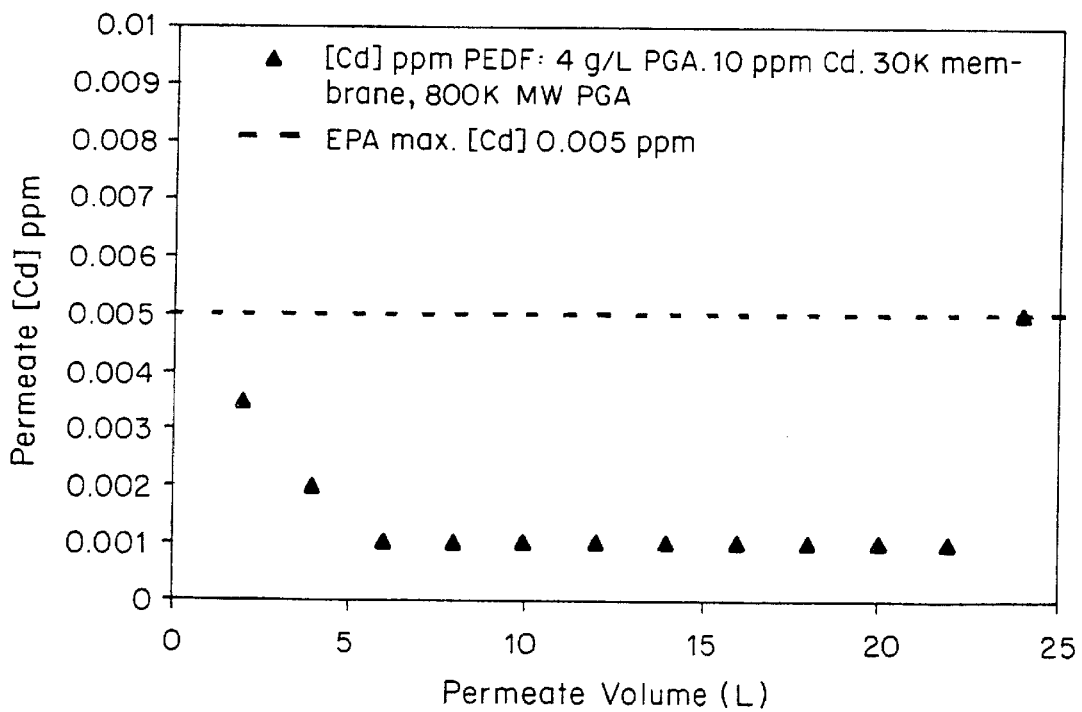
FIG. 11 shows PEDF with 4 g/l PGA in a 0.5 liter reactor at a CFR of 180 mL/min, a TMP of 9.0 PSI and 10 ppm cadmium, where the dotted like shows the EPA maximum discharge allowed for cadmium (0.005 ppm).

Effect of "Open Channel" TFF Membranes Having Reduced Pore Size:

A higher concentration of PGA was tested in the PEDF system using an open channel TFF filtration apparatus. In this experiment a 0.4% PGA solution was used in conjunction with a Millipore V channel membrane apparatus having a pore size of 30K. The pH of the 0.4% (w/v) PGA solution in de-ionized water was initially adjusted to pH 5.0 with 1 M HCl. The TFF apparatus comprised a Millipore Pellicon 2 mini-holder fitted with a 1 ft$^2$ membrane of 30,000 nominal weight limit (NMWL) membrane (V-channel type). The CFR and TMP were 180 mL/min and 9 PSI respectively. The copper solution was pumped in at the same rate as the filtrate flow rate (approximately 50–60 mL/min or a flux of 19–23 gal/ft$^2$/day). Filtrate flow rate decreased slightly from 65–80 mL/min for the 100K membrane to about 50–60 for the 30K membrane. The pH of the solution in the reservoir was adjusted periodically with the addition of 1 M NaOH to maintain the pH at 5.0. The copper solution was also adjusted to a pH of 5.0. Filtrate samples were collected in acid washed sample vials and shipped to an EPA approved metal analysis facility. The system was operated until near breakthrough, or breakthrough which was usually indicated by severe fluctuations in pressure across the membrane (TMP). Copper binding capacity was 180 mg copper/g PGA. FIGS. 9–11 show the results of experiments using 30 kDa membrane as described above for copper, lead and cadmium removal respectively.

Processing the Spent PGA:

After the end of the PEDF process, the reservoir volume was collected and the pH was adjusted with concentrated NaOH (12 M) to a pH of about 13. The pH adjusted reservoir volume was centrifuged and the solids were removed to achieve an additional ten-fold concentration of copper. The result was 45 mL of a sludge-like material (PGA-copper complexes). Based on the above process, copper was concentrated 800 fold (36 liters of 10 ppm copper was processed using PEDF in a volume of 500 mL followed by precipitation of the spent PGA (pH adjustment followed by centrifugation and decanting) for an overall volume reduction to 45 mL). The supernatant from the precipitation step described above had only 11 ppm copper and could be added upstream in the process (e.g. to the metal containing feed solution) to be further processed by PEDF, or in a continuous process with no adverse effect.

PGA Enhanced PEDF with Other Metal Ions:

Experiments were conducted using PEDF in combination with 4 g/l PGA as described above. The metal solution comprised either 10 ppm of lead or 10 ppm of cadmium. In addition, 10 ppm copper was tested. The PGA used was of molecular weight of about 800kDa and the CFR and TMP were 180 mL/min and 9.0 PSI respectively. The current EPA limit for copper discharge is 1.3 ppm. As demonstrated in FIG. 9, PGA can be used to reduce the level of copper in an aqueous solution to well below the EPA limit. In this experiment, over 35 liters of copper containing solution at 10 ppm was processed using 2 g of PGA, resulting in a filtrate copper concentration of as little as 0.003 ppm and at some points undetectable levels.

The current discharge limit by the EPA for lead is 0.015 ppm. As demonstrated in FIG. 10, the PEDF process of the present invention demonstrated that PGA can be effectively used to remove lead from a 10 ppm solution to below the EPA limit. In this experiment, more than 35 liters of lead containing solution at 10 ppm was processed using 2 g of PGA, resulting in a filtrate lead concentration of as little as 0.004 ppm.

The EPA discharge limit for cadmium is currently 0.005 ppm. As demonstrated in FIG. 11, PGA can be effectively used to reduce the level of cadmium to below the EPA limit. In this experiment, at least about 30 liters of cadmium containing solution at 10 ppm was processed using 4 grams of PGA, resulting in a filtrate cadmium concentration of as little as 0.001 ppm.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for separating at least a portion of a metal cation component from a waste stream, wherein the waste stream comprises the metal cation component and an aqueous component, comprising the steps of:
   a) combining the waste stream with a polymer solution, whereby at least a portion of said cation component binds to a linear anionic polymer component of said polymer solution to form linear anionic polymer-metal complexes; and
   b) separating at least a portion of said metal cation component from the aqueous component of the waste stream by diafiltration, comprising directing said combined solutions across a membrane, whereby said aqueous component migrates through said membrane forming a filtrate and a retentate, wherein the metal cation component accumulates in the retentate, and wherein additional waste stream is combined with the retentate, thereby separating at least a portion of said metal cation component from the waste stream.

2. The method of claim 1, further including the step of removing the linear anionic polymer-metal complexes from the retentate by precipitating the complexes.

3. The method of claim 1, wherein the linear anionic polymer comprises γ-polyglutamic acid.

4. The method of claim 1, wherein the concentration of said metal cation in the waste stream is less than about 50 ppm.

5. The method of claim 1, wherein the concentration of the metal cation in the filtrate is less than about 1 ppm.

6. The method of claim 1, wherein the metal cation is at least one member selected from the group consisting of copper, lead and cadmium.

7. The method of claim 6, wherein the cation is copper and the concentration of copper cations in the filtrate is less than 1.3 ppm.

8. The method of claim 6, wherein the metal cation is lead and the concentration of lead cations in the filtrate is less than 0.015 ppm.

9. The method of claim 6, wherein the metal cation is cadmium and the concentration of cadmium cations in the filtrate is less than 0.005 ppm.

10. The method of claim 1, further including the step of forming the linear anionic polymer solution by a method that includes diafiltration of said linear anionic polymer component of said polymer solution.

11. The method of claim 1, wherein the waste stream has a pH in a range of at least about 3.7 and about 5.0.

12. The method of claim 1, wherein the polymer solution has a pH in a range of at least about 3.7 and about 5.0.

13. The method of claim 1, wherein the pH of the combined solutions is maintained at about 5.0.

14. The method of claim 1, wherein a linear anionic polymer component of the linear anionic polymer solution has a weight average molecular weight of at least about 850,000 Daltons.

15. The method of claim 1, wherein the linear anionic polymer component of the polymer solution is present in an amount of at least about 2 grams per liter per $ft^2$ of membrane surface area contacting said solution.

16. The method of claim 1, wherein the linear anionic polymer a solution is present in a concentration of at least about 0.5% grams per liter of said solution.

17. The method of claim 2, wherein the linear anionic polymer-metal complexes are precipitated by raising the pH of the retentate to at least about 13.

18. The method of claim 1, wherein the linear anionic polymer is kept at constant concentration in the combined solutions.

19. The method of claim 1, wherein transmembrane pressure is maintained in a range of about 7 to about 22 PSI.

20. A method for separating at least a portion of a metal cation component from a waste stream, wherein the waste stream comprises the metal cation component and an aqueous component, comprising the steps of:
   a) combining the waste stream with a polymer solution whereby at least a portion of said cation component binds to a linear anionic polymer component of said polymer solution, wherein said linear anionic polymer component comprises γ-polyglutamic acid, to form γ-polyglutamic acid-metal complexes; and
   b) separating at least a portion of said metal cation component from the aqueous component of the waste stream by diafiltration, comprising directing said combined solutions across a membrane, whereby said aqueous component migrates through said membrane forming a filtrate and a retentate, wherein the metal cation component accumulates in the retentate, and wherein additional waste stream is combined with the retentate, thereby separating at least a portion of said cationic component from the waste stream.

21. The method of claim 20, further including the step of removing at least a portion of said γ-polyglutamic acid-metal complex from the retentate by precipitating the complexes.

22. The method of claim 21, wherein the γ-polyglutamic acid-metal complexes are precipitated by raising the pH of the retentate to at least about 13.

23. The method of claim 21, wherein the linear anionic polymer is kept at constant concentration in the combined solutions.

24. The method of claim 21, wherein the transmembrane pressure is maintained in a range of about 7 to about 22 PSI.

25. The method of claim 20, wherein the concentration of the metal cation in the waste stream is less than about 50 ppm.

26. The method of claim 20, wherein the concentration of the metal cation in the filtrate is less than about 1 ppm.

27. The method of claim 20, wherein the metal cation is at least one member selected from the group consisting of copper, iron and cadmium.

28. The method of claim 27, wherein the metal cation is lead and the concentration of lead cations in the filtrate is less than 0.015 ppm.

29. The method of claim 27, wherein the metal cation is cadmium and the concentration of cadmium cations in the filtrate is less than 0.005 ppm.

30. The method of claim 27, wherein metal cation is copper and the concentration of copper cations in the filtrate is less than 1.3 ppm.

31. The method of claim 20, further including the step of forming the linear anionic polymer solution by a method that includes diafiltration of said γ-polyglutamic acid component of said linear anionic polymer solution.

32. The method of claim 20, wherein the waste stream has a pH in a range of at least about 3.7 and about 5.0.

33. The method of claim 20, wherein the linear anionic polymer solution has a pH in a range of at least about 3.7 and about 5.0.

34. The method of claim 20, further including the step of maintaining a pH of the combined solutions at about 5.0.

35. The method of claim 20, wherein the γ-polyglutamic acid solution component has a weight average molecular weight of at least about 850,000 Daltons.

36. The method of claim 20, wherein the γ-polyglutamic acid component of the polymer solution is present in an amount of at least about 2 grams per liter per ft$^2$ of membrane surface area said polymer solution.

37. The method of claim 20, wherein the γ-polyglutamic acid component of the polymer solution is present in a concentration of at least about 0.5% grams per liter.

38. A method for separating at least a portion of a metal cation component from an aqueous component of an aqueous solution, comprising the steps of:
   a) combining the aqueous solution with a polymer solution, whereby at least a portion of said cation component binds to a linear anionic polymer component of said polymer solution, wherein said anionic polymer component comprises γ-polyglutamic acid having a weight average molecular weight of at least about 850,000 Daltons, to form γ-polyglutamic acid-metal complexes;
   b) separating at least a portion of said metal cation component from said aqueous component comprising directing said combined solutions across a membrane, whereby at least a portion of said aqueous component migrates, through said membrane forming a filtrate and a retentate, wherein the metal cation component accumulates in the retentate, thereby separating at least a portion of said cationic component from the aqueous component of the aqueous solution.

39. The method of claim 38, wherein the concentration of the metal cation in the filtrate is less than about 1 ppm.

40. The method of claim 39, wherein the metal cation is at least one member selected from the group consisting of copper, lead and cadmium.

41. The method of claim 40, wherein, the metal cation is copper and the concentration of copper cations in the filtrate is less than 1.3 ppm.

42. The method of claim 40, wherein the metal cation is lead and the concentration of lead cation in the filtrate is less than 0.015 ppm.

43. The method of claim 40 wherein, the metal cation is cadmium and the concentration of cadmium cation in the filtrate is less than 0.005 ppm.

44. The method of claim 39, further including the step of forming the linear anionic polymer solution by a method that includes diafiltration of said γ-polyglutamic acid component of said linear anionic polymer solution.

45. The method of claim 38, further comprising removing at least a portion of said γ-polyglutamic acid-metal complexes from the retentate by precipitating the complexes.

46. The method of claim 45, wherein the γ-polyglutamic acid-metal complexes are removed from the retentate by raising the pH of the retentate to at least about 13.

47. The method of claim 38, wherein the linear anionic polymer is kept at constant concentration in the combined solutions.

48. The method of claim 38, wherein the transmembrane pressure is maintained in a range of about 7 to about 22 PSI.

49. The method of claim 38, wherein the pH of the combined aqueous solution and anionic polymer solution is maintained in a range between about 4 and about 5.

50. The method of claim 38, wherein additional aqueous solution is combined with the retentate.

* * * * *

UNITED STATES PATENT AND TRADEMARK OFFICE
CERTIFICATE OF CORRECTION

PATENT NO. : 6,533,938 B1  
DATED : March 18, 2003  
INVENTOR(S) : Alexander DiIorio, Sonny Mark and Philip A. Tongue It is certified that error appears in the above-identified patent and that said Letters Patent is hereby corrected as shown below:

<u>Title page,</u>
Item [75], Inventors, please delete "DiIorio" and insert -- DiIorio --;
Item [73], Assignee, please delete "Institue" and insert -- Institute --.

Signed and Sealed this

Twenty-ninth Day of July, 2003

JAMES E. ROGAN
*Director of the United States Patent and Trademark Office*